(12) United States Patent
Cho et al.

(10) Patent No.: US 10,659,581 B2
(45) Date of Patent: May 19, 2020

(54) DISPLAY PANEL AND DISPLAY DEVICE HAVING THE SAME

(71) Applicant: Samsung Display Co., Ltd., Yongin-si, Gyeonggi-do (KR)

(72) Inventors: Sung-Ho Cho, Yongin-si (KR); Ki-Hyuk Kim, Yongin-si (KR); Ji-Yong Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/900,661

(22) Filed: Feb. 20, 2018

(65) Prior Publication Data
US 2018/0176353 A1 Jun. 21, 2018

Related U.S. Application Data

(63) Continuation of application No. 14/570,515, filed on Dec. 15, 2014, now Pat. No. 9,936,056.

(30) Foreign Application Priority Data

Jan. 6, 2014 (KR) ........................ 10-2014-0001298

(51) Int. Cl.
*H04M 1/02* (2006.01)
*H01L 51/52* (2006.01)
*H04M 1/18* (2006.01)
*G02F 1/1339* (2006.01)

(52) U.S. Cl.
CPC ...... *H04M 1/0266* (2013.01); *H01L 51/5246* (2013.01); *G02F 1/1339* (2013.01); *H04M 1/18* (2013.01)

(58) Field of Classification Search
None
See application file for complete search history.

(56) References Cited

U.S. PATENT DOCUMENTS

| 8,067,883 | B2 | 11/2011 | Wang | |
|---|---|---|---|---|
| 8,319,425 | B2 | 11/2012 | Kwon | |
| 2004/0135941 | A1* | 7/2004 | Nam | G02F 1/133512 349/110 |
| 2005/0184927 | A1 | 8/2005 | Kwak | |

(Continued)

FOREIGN PATENT DOCUMENTS

| JP | 6-82804 A | 3/1994 |
|---|---|---|
| JP | 2002350820 A * | 12/2002 |

(Continued)

*Primary Examiner* — Robert K Carpenter
(74) *Attorney, Agent, or Firm* — Cantor Colburn LLP

(57) ABSTRACT

A display panel and display device having the same are disclosed. In one aspect, the display panel includes a first substrate including a display region configured to display images and a non-display region surrounding the display region. The display panel further includes a metal pattern disposed in the non-display region, a second substrate opposing the first substrate, and a sealant disposed between and substantially sealing the first and second substrates, wherein the sealant at least partially overlaps the metal pattern. The metal pattern includes a body portion surrounding the display region and a plurality of protrusions extending from the body portion in a direction from the display region to the non-display region.

11 Claims, 4 Drawing Sheets

(56) References Cited

U.S. PATENT DOCUMENTS

| | | |
|---|---|---|
| 2006/0197902 A1 | 9/2006 | Choi et al. |
| 2012/0293064 A1* | 11/2012 | Hong .................. H01L 51/5246 313/504 |
| 2012/0319574 A1 | 12/2012 | Kim et al. |

FOREIGN PATENT DOCUMENTS

| | | |
|---|---|---|
| KR | 10-2005-0082260 A | 8/2005 |
| KR | 10-2009-0041613 A | 4/2009 |
| KR | 10-2012-0139075 A | 12/2012 |

* cited by examiner

DISPLAY PANEL AND DISPLAY DEVICE HAVING THE SAME

INCORPORATION BY REFERENCE TO ANY PRIORITY APPLICATIONS

This application is a continuation of application Ser. No. 14/570,515, filed on Dec. 15, 2014, which claims priority to and the benefit of Korean Patent Application No. 10-2014-0001298, filed on Jan. 6, 2014, in the Korean Intellectual Property Office, the contents of which are incorporated herein by reference in their entirety.

BACKGROUND

Field

The described technology generally relates to a display panel and a display device having the same.

Description of the Related Technology

Display panels, such as organic light-emitting diode (OLED) display panels, liquid crystal display (LCD) panels, electrophoretic display (EPD) panels, and electrowetting display (EWD) panels are employed in display devices to display images. The standard display device includes a display panel, a case housing the display panel, a window protecting the display panel, and an antenna receiving wireless signals.

Display panels are sealed with a sealant to prevent contaminants from penetrating. The sealing process includes coating a sealant material between a pair of substrates and hardening using laser or ultraviolet light. One of the substrates can include a metal layer to improve the uniformity of the laser or ultraviolet light profile. However, when the metal layer overlaps the wireless antenna of a display device, the strength of signals received at the antenna decrease, thereby reducing the signal sensitivity.

SUMMARY OF CERTAIN INVENTIVE ASPECTS

One inventive aspect is a display panel that can improve signal receiving sensitivity of an antenna and a display device having the same.

Another aspect is a display panel including a first substrate, a second substrate facing the first substrate, and a sealant. The first substrate includes a display region displaying images and a non-display region surrounding the display region, wherein the first substrate includes a metal pattern disposed in the non-display region. The sealant is disposed between the first and second substrates and overlaps the metal pattern to connect to the first and second substrate. The metal pattern includes a body portion surrounding the display region and a plurality of protrusions protruding from the body portion in the opposite direction of the display region.

The first substrate includes a base substrate, a thin film transistor disposed on the base substrate in the display region, and a display element electrically connected to the thin film transistor in the display region, wherein the metal pattern and one of a gate electrode and source/drain electrode of the thin film transistor are disposed on the same layer.

The width of the body portion is equal to or greater than 200 μm and the width of the protrusions is equal to or less than 20 μm. The distance between adjacent protrusions is equal to or greater than 1 mm and less than 20 mm.

The display panel further includes at least one pattern hole disposed between the adjacent protrusions and exposing the base substrate and the distance between adjacent holes is equal to or greater than 20 μm.

Another aspect is a display device including a display panel including a display region displaying image and a non-display region surrounding the display region, wherein a signal receiving portion overlaps a portion of the non-display region and receives wireless signals.

The display panel includes a first substrate, a second substrate facing the first substrate, and a sealant. The first substrate includes a display element disposed in the display region and a metal pattern disposed in the non-display region. The sealant is disposed between the first and second substrate and overlaps the metal pattern. The metal pattern includes a body portion surrounding the display region and a plurality of protrusions protruding from the body portion in the opposite direction of the display region and overlaps the signal receiving portion.

Another aspect is a display panel including a first substrate including a display region configured to display images and a non-display region surrounding the display region, a metal pattern disposed in the non-display region, a second substrate opposing the first substrate, and a sealant disposed between and substantially sealing the first and second substrates, wherein the sealant at least partially overlaps the metal pattern, and wherein the metal pattern includes a body portion surrounding the display region and a plurality of protrusions extending from the body portion in a direction from the display region to the non-display region.

The first substrate can include a base substrate, a thin film transistor disposed over the base substrate in the display region, and a display element electrically connected to the thin film transistor in the display region, wherein the thin film transistor includes gate, source, and drain electrodes, and wherein the metal pattern and the gate electrode or the source and drain electrodes are disposed on the same layer. The width of the body portion can be substantially equal to or greater than about 200 μm. The width of each of the protrusions can be substantially equal to or less than about 20 μm. The distance between adjacent protrusions can be substantially equal to or greater than about 1 mm and less than about 20 mm. The display panel can further include an insulating layer having at least one pattern hole disposed between the adjacent protrusions. The distance between adjacent pattern holes can be substantially equal to or greater than about 20 μm. The metal pattern and the gate electrode can be disposed on the same layer.

Another aspect is a display device including a display panel including a display region configured to display images and a non-display region surrounding the display region and a signal receiver overlapping at least a portion of the non-display region and configured to wirelessly receive signals, wherein the display panel includes a first substrate including a display element disposed in the display region and a metal pattern disposed in the non-display region, a second substrate opposing the first substrate, a sealant disposed between and substantially sealing the first and second substrates, wherein the sealant at least partially overlaps the metal pattern, wherein the metal pattern includes a body portion surrounding the display region and a plurality of protrusions extending from the body portion in a direction from the display region to the non-display region, wherein the signal receiver at least partially overlaps the protrusions.

The first substrate can include a base substrate, a thin film transistor disposed over the base substrate in the display region, and a display element electrically connected to the thin film transistor in the display region, wherein the thin film transistor includes gate, source, and drain electrodes, and wherein the metal pattern and i) the gate electrode or ii) the source and drain electrodes are disposed on the same layer. The width of the body portion can be substantially equal to or greater than about 200 µm. The width of each of the protrusions can be substantially equal to or less than about 20 µm. The distance between adjacent protrusions can be substantially equal to or greater than about 1 mm and less than about 20 mm. The display device further including an insulating layer having at least one pattern hole disposed between the adjacent protrusions. The distance between adjacent pattern holes can be substantially equal to or greater than about 20 µm. The metal pattern and the gate electrode can be disposed on the same layer.

Another aspect is a display device including a first substrate including a display region and a non-display region surrounding the display region, a metal pattern disposed in the non-display region and having a plurality of protrusions and recesses disposed on an outer surface thereof, a second substrate opposing the first substrate, and a sealant disposed between and substantially sealing the first and second substrates, wherein the sealant at least partially overlaps the metal pattern.

The display device further includes a receiver configured to wirelessly receive signals, wherein the receiver at least partially overlaps the protrusions. The display device further includes an insulating layer disposed in the recesses of the metal pattern and having a plurality of holes disposed therein. The holes can be arranged in a matrix

DETAILED DESCRIPTION OF CERTAIN INVENTIVE EMBODIMENTS

Figure 1:
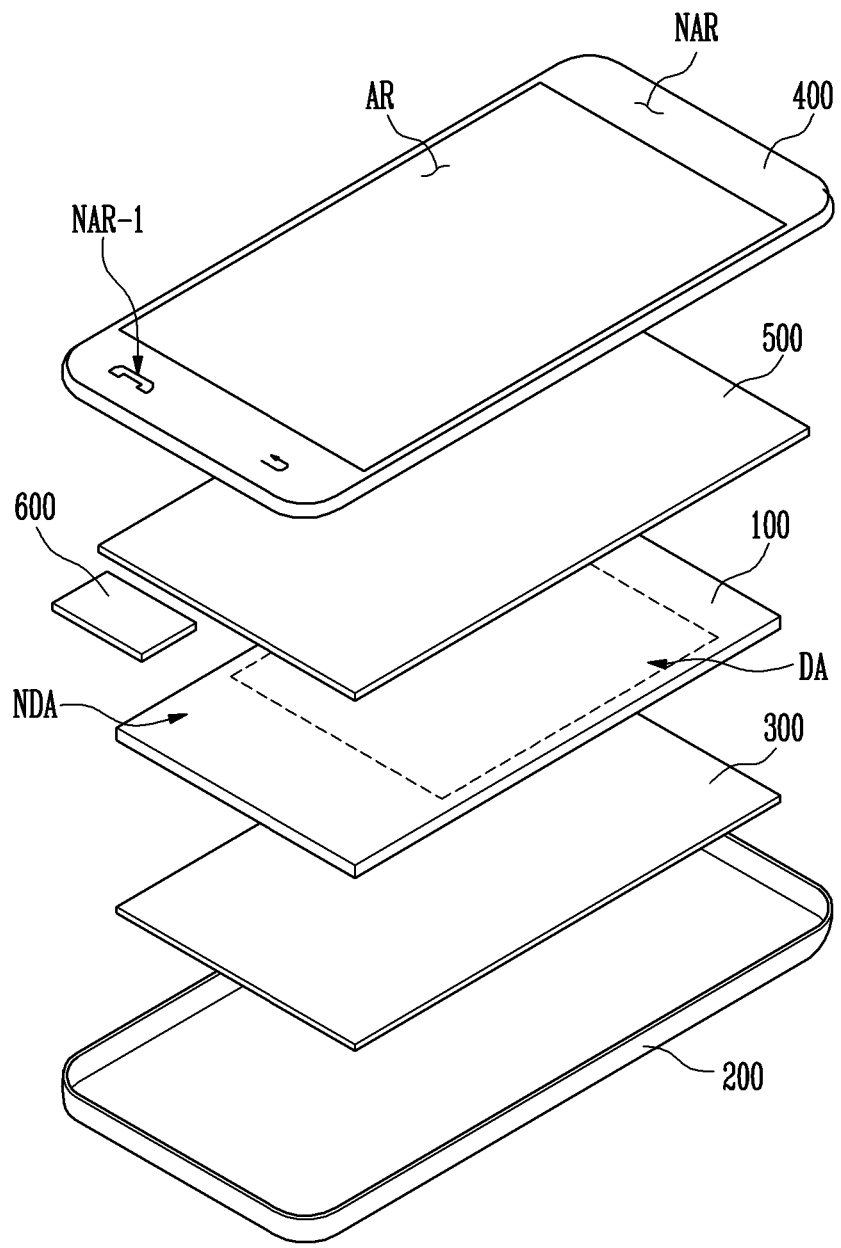
FIG. 1 is an exploded perspective view illustrating a display device according to an embodiment.

The described technology can be modified and embodied in various different ways, particular examples of which will be illustrated in the drawings and described in detail. However, it is to be understood that the described technology is not limited to a specific disclosed form, but includes all modifications, equivalents, and substitutions without departing from the scope and spirit of the described technology.

In the drawings, like numbers refer to like elements. In the accompanying drawings, the dimensions of structures may be exaggerated to clarify the described technology. While terms such as "first" and "second," etc., may be used to describe various components, such components must not be understood as being limited to the above terms. The above terms are used only to distinguish one component from another. For instance, a first component may be referred to as a second component without departing from the scope of the described technology, and likewise a second component may be referred to as a first component. As used herein, the singular forms "a," "an," and "the" are intended to include the plural forms as well, unless the context clearly indicates otherwise.

In the present application, it is to be understood that the terms such as "including" or "having," etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added. Also, it will be understood that when an element such as a layer, film, region, or substrate is referred to as being "on" another element, it can be directly on the other element or intervening elements may also be present. Similarly, it will be understood that when an element such as a layer, film, region, or substrate is referred to as being "beneath" another element, it can be directly under the other element or intervening elements may also be present. The term "substantially" as used in this disclosure means completely, almost completely, or to any significant degree.

Hereinafter, embodiments of the described technology will be described in detail with reference to the accompanying drawings.

Figure 2:
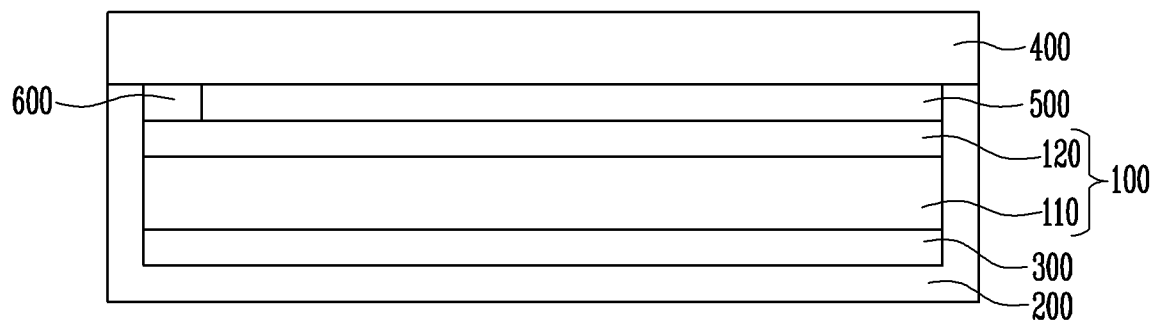
FIG. 2 is a cross sectional view illustrating the display device in FIG. 1.

FIG. 1 is an exploded perspective view illustrating a display device according to an embodiment and FIG. 2 is a cross sectional view illustrating the display device in FIG. 1.

Referring to FIGS. 1 and 2, the display device includes a display panel 100, a housing 200 for receiving the display panel 100, an impact absorption sheet 300, and a signal receiving portion or signal receiver 600 disposed between the display panel 100 and the housing 200. The display device also includes a window member 400 disposed over the display panel 100 and a polarization member 500 disposed between the display panel 100 and the window member 400.

The display panel 100 includes a display area DA displaying images and a non-display area NDA surrounding the display area DA. The display panel 100 is not limited to a specific display technology. For instance, the display panel 100 can include a self-emitting display panel such as an organic light-emitting diode (OLED) panel, a plasma display panel (PDP), or the like. Further, the display panel 100 can include a non-emissive display panel such as a liquid crystal display (LCD) panel, an electrophoretic display (EPD) panel, an electrowetting display (EWD) panel, or the like. When a non-emissive display panel is used as the display panel 100, the display device includes a back-light unit that supplies light to the display panel 100. The described technology will be described using an OLED display panel as an example of the display panel 100.

The display panel 100 further includes a first substrate 110 and a second substrate 120.

The first substrate 110 includes a thin film transistor disposed on an insulation substrate and a display element electrically connected to the thin film transistor. Herein, the thin film transistor and the display element are disposed in the display area.

The display element includes a first electrode electrically connected to the thin film transistor, an organic layer disposed on the first electrode, and a second electrode disposed on the organic layer. One of the first and second electrodes is an anode and the other electrode is a cathode. At least one of the first and second electrodes is a transparent electrode.

The second substrate 120 isolates the display elements from the environment. The second substrate 120 is sealed to the first substrate 110 via a sealant material or sealant thin film. Herein, the sealant is disposed in the non-display area.

The housing 200 houses the display panel 100. In the embodiment of FIG. 1, the housing is disposed of a member having a space in which the display panel 100 is housed. However, it is well understood that the housing 200 can be disposed of two or more members. The described technology will be described using an example of the housing 200 disposed of one member.

In addition to the display panel 100, although not shown in FIG. 1, the housing 200 may further house a printed circuit board on which a plurality of active elements and/or a plurality of passive elements are mounted. The housing 200 can house a power supply (not shown) such as a battery according to the type of the display device.

The impact absorption sheet 300 is disposed between the display panel 100 and the housing 200 and absorbs external impacts applied to the display panel 100. Thus, the impact absorption sheet 300 can substantially prevent external impacts from being directly transmitted to the display panel 100.

The impact absorption sheet 300 may include an impact absorption film (not shown) that can absorb external impacts and an adhesive material (not shown) coated on at least one surface of the impact absorption film. For instance, the adhesive material may be coated on one surface of the impact absorption film such that the impact absorption sheet 300 is fixed at the display panel 100 or the housing 200. The impact absorption film may be disposed of a rubber foam or a lamination of the rubber foam and may have a thickness of about 300 μm. However, according to the embodiment, the thickness of the impact absorption film can be less than or greater than about 300 μm.

The window member 400 over the display panel 100 in the direction light is emitted from the display panel 100. The window member 400 is attached to the housing 200 to form an outer surface of the display device.

The window member 400 includes a transmission region AR for displaying images generated from the display panel 100 and a non-transmission region NAR adjacent to at least a portion of the transmission region AR. The non-transmission region NAR is not be used to display images. That is, the transmission region AR corresponds to the display area DA and the non-transmission region NAR corresponds to the non-display area NDA.

In addition, at least a portion of the non-transmission region NAR may be defined as an input icon region NAR-1. The input icon region NAR-1 is activated when the display device operates in a specific mode.

The polarization member 500 reduces the reflection of light incident on the display device (hereinafter, referred to as an external light), thereby improving the image display performance of the display panel 100. For instance, the polarization member 500 can include a polarization film (not shown) having a polarization axis in a specific direction and a retardation film (not shown) having a phase difference of about ¼ k. The polarization member 500 converts the external light into a circular polarization, thereby reducing reflections. The polarization member 500 omitted from the display device depending on the embodiment.

The signal receiving portion 600 can be a standard antenna and the signal receiving portion 600 is disposed so as to overlap the non-display area NDA of the display panel 100. In addition, the signal receiving portion 600 receives signals and transfers the received signals to controller (not shown) of the display device. The controller transfers the received signals to the display panel 100 and the display panel 100 displays images.

Referring to FIG. 3 to FIG. 7, the signal receiving portion 600 overlaps a portion of a display panel 100. As described above, the display panel 100 includes a display region DA displaying images and a non-display region NDA surrounding the display region. The signal receiving portion 600 overlaps the non-display region NDA of the display panel 100. The non-display region NDA surrounds the display region DA.

The display panel 100 includes a first substrate 110 including a display element OLED disposed in the display region DA, a second substrate 120 facing the first substrate 110, and a sealant 130 substantially sealing the first and second substrates 110 and 120. The sealant 130 is disposed in the non-display region NDA.

In the display region DA, the first substrate 110 includes a switching transistor TRs, a driving transistor TRd, a capacitor Cst and the display element OLED.

More particularly, the switching transistor TRs and the driving transistor TRd are disposed on a base substrate 111. The base substrate 111 may be a rigid type substrate or a flexible type substrate. The rigid type substrate can include a glass substrate, a quartz substrate, a glass ceramic substrate, or a crystalline glass substrate. The flexible type substrate can include a film substrate or a plastic substrate that include a high molecular organic matter. It is desirable that the material used for the base substrate 111 has resistance (or heat-resistance) against high processing temperatures such as produced when manufacturing processes are performed.

The switching transistor TRs and the driving transistor TRd include a semiconductor active layer SA, a gate electrode GE electrically insulated from the semiconductor active layer SA, and source and drain electrodes SE and DE contacting the semiconductor active layer SA, which are disposed on the base substrate 111.

The semiconductor active layer SA includes a poly-silicon p-Si or oxide semiconductor. In addition, the semiconductor active layer SA includes a source region contacting the source electrode SE, a drain region contacting the drain electrode DE, and a channel region disposed between the source and drain regions. To this end, the source and drain regions are doped with impurities. The oxide semiconductor includes one or more of Zn, In, Ga, Sn, or a mixture thereof. For instance, the oxide semiconductor may include indium-gallium-zinc oxide (IGZO).

Although not shown in figures, when the semiconductor active layer SA includes the oxide semiconductor, a light blocking layer can be disposed on and under the oxide semiconductor active layer SA to block light from traveling to the oxide semiconductor active layer SA.

A buffer layer 112 is disposed between the semiconductor active layer SA and the base substrate 110. The buffer layer 112 may be a silicon oxide layer or a silicon nitride layer, or may have a multi-layer structure including the silicon oxide layer and the silicon nitride layer. The buffer layer 112 substantially prevents impurities and moisture from diffusing or penetrating to the switching transistor TRs, the driving transistor TRd, and the display element OLED. In addition, the buffer layer 112 planarizes the top surface of the base substrate 111.

A gate insulating layer 113 is disposed on the semiconductor active layer SA and the base substrate 111 to cover the semiconductor active layer SA and the base substrate 111, and thus the semiconductor active layer SA and the gate electrode GE are electrically insulated from each other. The gate insulating layer 113 may include silicon oxide (SiO2) and/or silicon nitride (SiNx).

The gate electrode GE and a first capacitor electrode C1 are disposed on the gate insulating layer 113. Herein, the gate electrode GE overlaps the channel region of the semiconductor active layer SA. In addition, the gate electrode GE may include a material that reflects light.

An inter-insulating layer 114 is disposed on the gate insulating layer 113 and the gate electrode GE. The inter-insulating layer 114 includes silicon oxide and/or silicon nitride similar to the gate insulating layer 113. In addition, the inter-insulating layer 114 includes contact holes to expose portions of the source and drain regions.

The source and drain electrodes SE and DE and a second capacitor electrode C2 are disposed on the inter-insulating layer 114. The source and drain electrodes SE and DE and the second capacitor electrode C2 may include a material that reflects light. For instance, the source and drain electrodes SE and DE and the second capacitor electrode C2 may include Aluminium (Al) or an Aluminium ally (Al-alloy).

In addition, the source and drain electrodes SE and DE and the second capacitor electrode C2 are electrically insulated from the gate electrode GE. The source and drain electrodes SE and DE respectively contact the source and drain regions.

Figure 4:
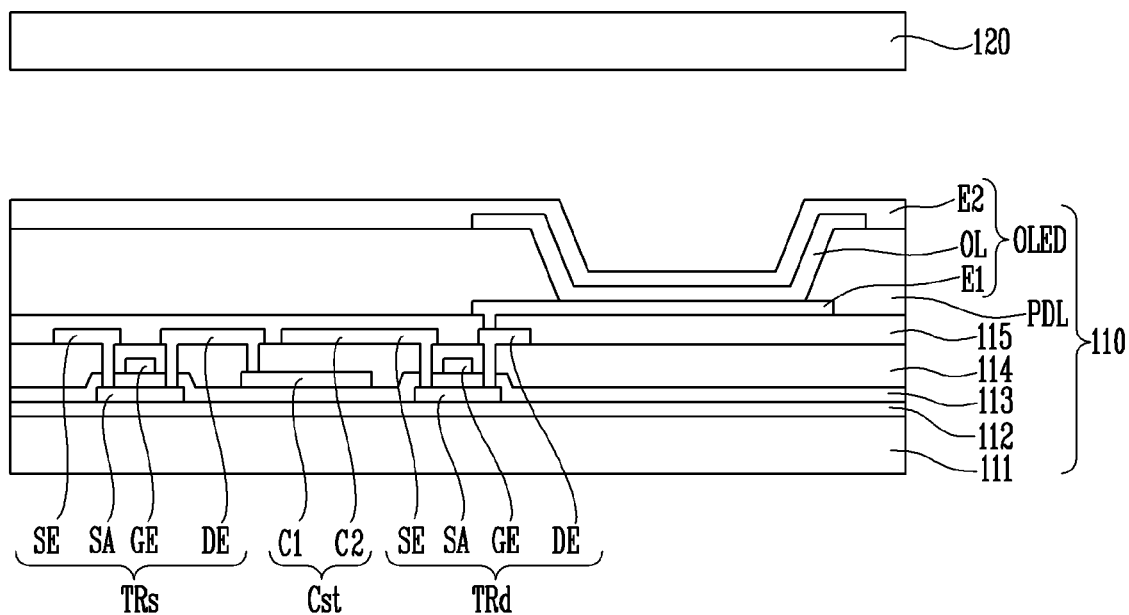
FIG. 4 is a sectional view taken along line I-I' of FIG. 3.

In the embodiment of FIG. 4, the driving transistor TRd and the switching transistor TRs have been described as having a top gate structure; however, the described technology is not limited thereto. For instance, at least one of the driving transistor TRd and the switching transistor TRs can be configured to have a bottom gate structure.

The capacitor Cst includes the first and second capacitor electrodes C1 and C2, The first capacitor electrode C1 can be disposed of the same material and on the same layer as the gate electrode GE. The second capacitor electrode C2 can be disposed of the same material and on the same layer as the source and drain electrodes SE and DE.

A protection layer 115 is disposed on the base substrate 111 including the switching transistor TRs, the driving transistor TRd, and the capacitor C. In some embodiments, the protection layer 115 covers the switching transistor TRs, the driving transistor TRd, and the capacitor C. In addition, the protection layer 115 includes a contact hole CH exposing a portion of the drain electrode DE.

The protection layer 115 includes at least one layer. In detail, the protective layer 115 includes an inorganic protective layer and/or an organic protective layer disposed on the inorganic protective layer. The inorganic protective layer includes one or more of silicon oxide and silicon nitride. In addition, the organic protective layer includes one or more of acryl, polyimide, polyamide, and benzocyclobutene. That is, the organic protective layer may have transparency and may have fluidity during manufacturing to planarize the top surface thereof.

The display element OLED is disposed on the protective layer 115. Depending on the embodiment, the display element OLED can be one of a liquid crystal display element, an electrophoretic display element, an electrowetting display element, and an organic light-emitting diode display element. In the embodiment of FIG. 4, the display element OLED is an OLED.

The display element OLED includes a first electrode E1, an organic layer OL disposed on the first electrode E1, and a second electrode E2 disposed on the organic layer OL.

In the FIG. 4 embodiment, the first electrode E1 serves as the anode and the second electrode E2 serves as the cathode.

The first electrode E1 is disposed on the protection layer 115 and contacts the drain electrode DE of the driving thin film transistor TRd. The first electrode E1 includes a transparent conductive oxide, e.g., indium tin oxide (ITO), indium zinc oxide (IZO), aluminum zinc oxide (AZO), gallium-doped zinc oxide (GZO), zinc tin oxide (ZTO), gallium tin oxide (GTO), fluorine-doped tin oxide (FTO), etc.

A portion of the first electrode E1 is exposed by a pixel defining layer PDL. The pixel defining layer PDL may include an organic insulating material. For instance, the pixel defining layer PDL may include one or more of polystyrene, poly methyl methacrylate (PMMA), polyacrylonitrile (PAN), polyamide, polyimide, polyarylether, heterocyclic polymer, poly(p-xylylene) polymer (e.g., Parylene), fluorine series polymer, epoxy resin, benzocyclobutene series resin, siloxane series resin, or silane.

The organic layer OL is disposed on the first electrode E1 exposed by the pixel defining layer PDL. The organic layer OL may include at least an emitting layer (EML) and can have a multi-layered thin film structure. For instance, the organic layer OL can include the emitting layer (EML) and/or one or more layer selected from a hole injection layer (HIL) for injecting holes, a hole transport layer (HTL) having a superior transportation characteristic and for blocking migration of unbound electrons at the EML to increase the chance of hole-electron rebinding (the EML emitting light by rebinding the injected electrons to holes), a hole blocking layer (HBL) for suppressing migration of unbound holes at the EML, an electron transport layer (ETL) for smoothly transporting the electrons to the EML, and an electron injection layer (EIL) for injecting the electrons. The color of light generated in the EML can be red, green, blue, and/or white, but the described technology is not limited thereto. For instance, the color of light generated in the EML can be magenta, cyan, and/or yellow.

The second electrode E2 is disposed on the organic layer OL and may include a material having a work function less than that of the first electrode E1. The second electrode E2 may include molybdenum (Mo), tungsten (W), silver (Ag), magnesium (Mg), aluminum (Al), platinum (Pt), palladium (Pd), gold (Au), nickel (Ni), neodymium (Nd), iridium (Ir), chromium (Cr), lithium (Li), calcium (Ca), and/or an alloy thereof. The second electrode E2 may have a thickness such that light can be transmitted therethrough.

A transparent conductivity layer (not shown) can be disposed on the second electrode E2 to prevent a voltage drop (e.g., IR-drop) at the second electrode E2. The transparent conductivity layer can include the same material as the first electrode E1.

In the non-display region, the first substrate 110 includes a metal pattern MP disposed on the same layer as one of the gate electrode GE, the source electrode SE, and the drain electrode DE. For instance, the metal pattern MP can be disposed on the gate insulating layer 113 and covered by the inter-insulating layer 114 to be disposed on the same layer as the gate electrode GE. The metal pattern MP overlaps the sealant 130. Thus, the metal pattern MP functions as a reflecting plate that reflects irradiated laser or ultraviolet light.

In addition, the metal pattern MP includes a body portion MP1 surrounding the display region DA and a plurality of protrusions MP2 protruding from the body portion MP1 in a direction away from the display region DA.

Figure 3:
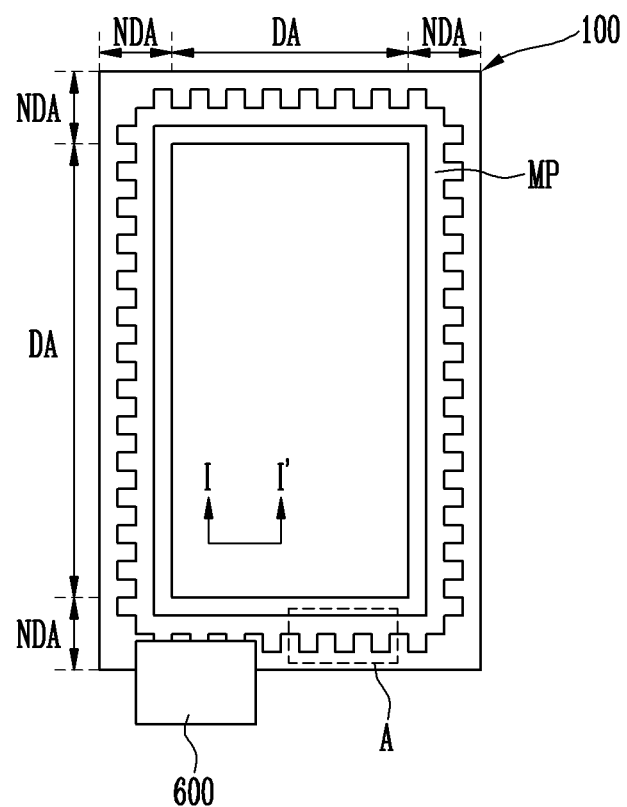
FIG. 3 is a plane view illustrating the display panel and a signal receiving portion in FIG. 1.
Figure 5:
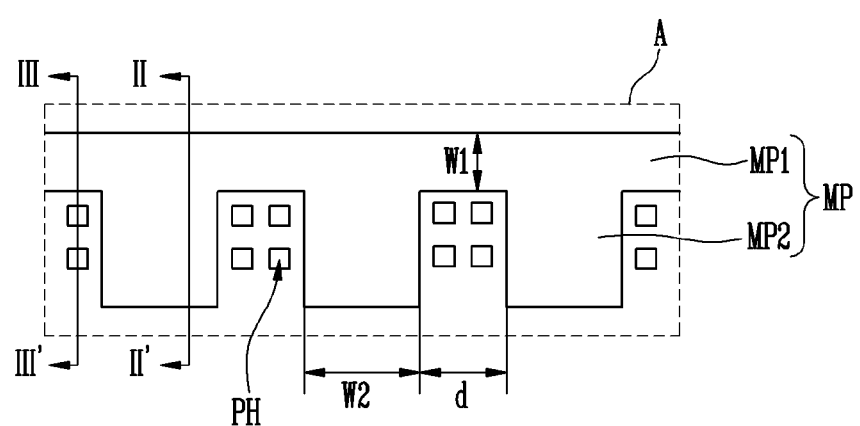
FIG. 5 is an enlarged view of a region 'A' in FIG. 3.
Figure 6:
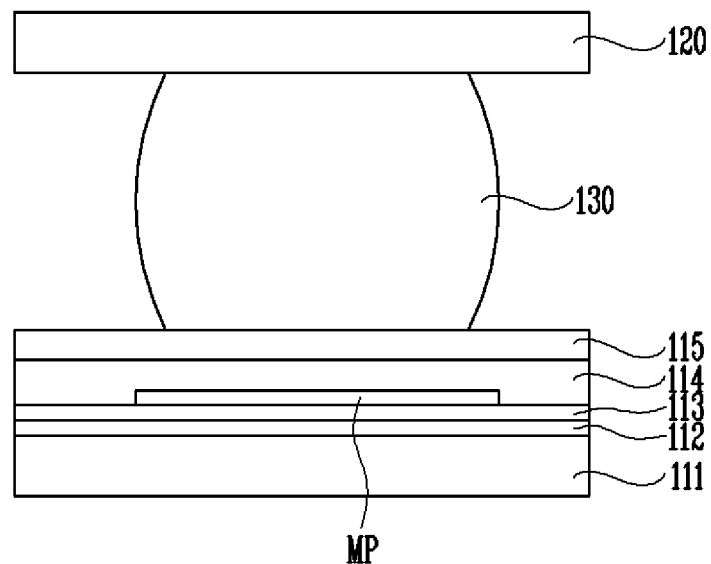
FIG. 6 is a sectional view taken along line II-II' of FIG. 5.
Figure 7:
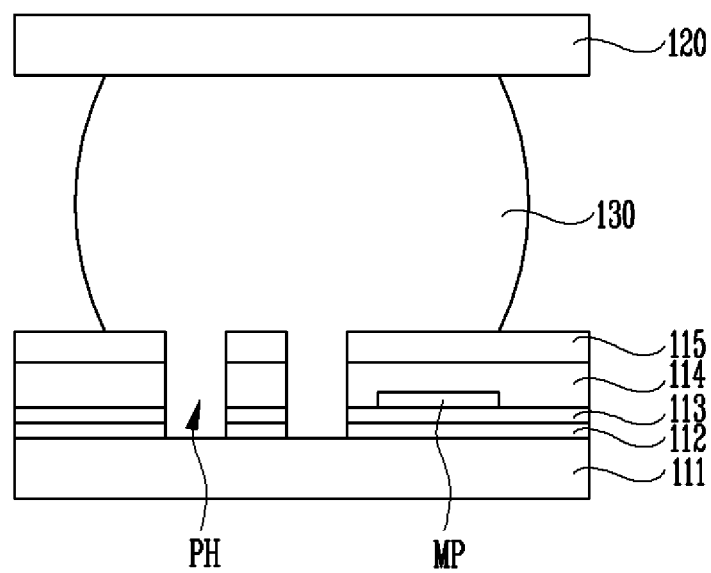
FIG. 7 is a cross-sectional view taken along line III-III' of FIG. 5.

In the embodiment of FIGS. 3-5, the width W1 of the body portion MP1 is equal to or greater than about 200 μm. If the width W1 of the body portion MP1 is less than about 200 μm, the amount of the laser or ultraviolet light reflected by the metal pattern MP may not be sufficient to cure the sealant 130, resulting in a sealant 130 having an insufficient strength. Accordingly, the coupling strength between the first and second substrates 110 and 120 may be poor.

The protrusions MP2 overlap the signal receiving portion 600. The signal receiving portion 600 receives the signal through a region defined between the protrusions MP2. Thus, any reductions in the signal receiving sensitivity of the signal receiving portion 600 can be substantially prevented.

In addition, the width W2 of the protrusions MP2 is equal to or less than about 20 mm. The distance d between adjacent protrusions MP2 is equal to or greater than about 1 mm and less than about 20 mm. Therefore, the signal can be transmitted through the region between adjacent protrusions MP2. Thus, even when the body portion MP1 overlaps the signal receiving portion 600, the signal receiving portion 600 can maintain a sufficient signal receiving sensitivity.

A plurality of pattern holes PH are disposed in the region between adjacent protrusions MP2. According to some embodiments, the distance between adjacent pattern holes PH is equal to or greater than about 20 μm. The sealant 130 is filled in the pattern holes PH. Thus, the coupling strength between the first and second substrate 110 and 120 is increased.

The second substrate 120 faces the first substrate 110 and the second substrate 120 is an encapsulation substrate. For instance, the second substrate 120 may be substantially the same as the base substrate 111.

The sealant 130 is disposed between the first and second substrates 110 and 120 overlaps the metal pattern MP. The sealant 130 may be light-curable sealant. For instance, the sealant 130 may be curable by laser or ultraviolet light.

The thickness of the sealant 130 is related to the distance between the metal pattern MP and the second substrate 120. That is, the thickness of the sealant 130 is the difference between the distance from the metal pattern MP to the second substrate 120 and the thickness of the insulation layers disposed on the metal pattern MP.

The distance between the metal pattern MP and the second substrate 120 can be selected to increase constructive interference between light incident on the metal pattern MP and light reflected from the metal pattern MP. When the incident and reflected light with respect to the metal pattern MP forms a stationary wave, the distance of the constructive interference satisfies Equation 1.

$$L = \lambda/4 + (n-1)\lambda/2 \quad \text{Equation 1}$$

In Equation 1, L is the distance of the constructive interference, n is a natural number, and λ is the wave length of the light incident on the metal pattern MP.

Therefore, the sealant 130 can be hardened more effectively when the distance between the metal pattern MP and the second substrate 120 satisfies the above Equation 1.

In a display device including the display panel 100, signals are transmitted and received through the region between adjacent protrusions MP2. Thus, even though the body portion MP1 overlaps the signal receiving portion 600, the signal receiving portion 600 can receive the signals with a sufficient sensitivity.

Exemplary embodiments have been disclosed herein, and although specific terms are employed, they are used and are to be interpreted in a generic and descriptive sense only and not for the purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A display panel, comprising:
   a base substrate including a display region configured to display images and a non-display region surrounding the display region;
   a gate insulating layer disposed on the base substrate;
   an inter-insulating layer disposed on the gate insulating layer;
   a gate electrode of a transistor disposed in the display region and disposed between the gate insulating layer and the inter-insulating layer; and
   a metal pattern disposed in the non-display region and disposed between the gate insulating layer and the inter-insulating layer,
   wherein the metal pattern comprises:
      a body portion surrounding the display region; and
      a plurality of protrusions extending from the body portion in a direction from the display region to the non-display region, and
   wherein a width of each of the protrusions is substantially equal to or less than about 20 millimeters (mm).

2. The display panel of claim 1,
   wherein the transistor further includes a source electrode, and a drain electrode.

3. The display panel of claim 2,
   wherein at least one of the source electrode and the drain electrode is disposed on the inter-insulating layer.

4. The display panel of claim 3, further comprising:
   a protection layer covering at least one of the source electrode and the drain electrode; and
   an organic light emitting diode (OLED) disposed on the protection layer,
   wherein one of the source electrode and the drain electrode is connected to the OLED through a contact hole of the protection layer.

5. The display panel of claim 4,
   wherein the protection layer has at least one pattern hole disposed between the adjacent protrusions.

6. The display panel of claim 5, wherein a distance between adjacent pattern holes is substantially equal to or greater than about 20 μm.

7. The display panel of claim 1, wherein a width of the body portion is substantially equal to or greater than about 200 μm.

8. The display panel of claim 7, wherein a distance between adjacent protrusions is substantially equal to or greater than about 1 mm and less than about 20 mm.

9. A display panel, comprising:
   a base substrate including a display region configured to display images and a non-display region surrounding the display region;
   a gate insulating layer disposed on the base substrate;
   an inter-insulating layer disposed on the gate insulating layer;
   a protection layer disposed on the inter-insulating layer;

one of a source electrode and a drain electrode of a transistor disposed in the display region and disposed between the inter-insulating layer and the protection layer; and a metal pattern disposed in the non-display region and disposed between the inter-insulating layer and the protection layer, wherein the metal pattern comprises:
- a body portion surrounding the display region; and
- a plurality of protrusions extending from the body portion in a direction from the display region to the non-display region, and wherein a width of each of the protrusions is substantially equal to or less than about 20 millimeters (mm).

10. The display panel of claim 9, further comprising:
an OLED disposed on the protection layer,
wherein one of the source electrode and the drain electrode is connected to the OLED through a contact hole of the protection layer.

11. The display panel of claim 10,
wherein the protection layer has at least one pattern hole disposed between the adjacent protrusions.

* * * * *